United States Patent
Kohlenberg et al.

(10) Patent No.: US 9,258,304 B2
(45) Date of Patent: Feb. 9, 2016

(54) METHODS AND APPARATUS FOR USING KEYS CONVEYED VIA PHYSICAL CONTACT

(71) Applicant: McAfee, Inc., Santa Clara, CA (US)

(72) Inventors: Tobias M. Kohlenberg, Portland, OR (US); Hong Li, El Dorado Hills, CA (US); Rita H. Wouhaybi, Portland, OR (US); Igor Tatourian, Santa Clara, CA (US)

( * ) Notice: Subject to any disclaimer, the term of this patent is extended or adjusted under 35 U.S.C. 154(b) by 24 days.

(21) Appl. No.: 14/317,662

(22) Filed: Jun. 27, 2014

(65) Prior Publication Data
US 2015/0381619 A1    Dec. 31, 2015

(51) Int. Cl.
G06F 7/04     (2006.01)
G06F 15/16    (2006.01)
G06F 17/30    (2006.01)
H04L 29/06    (2006.01)

(52) U.S. Cl.
CPC .......... *H04L 63/0876* (2013.01); *H04L 63/062* (2013.01)

(58) Field of Classification Search
CPC ... H04L 63/08; H04L 63/083; H04L 63/0876; G06F 21/31; H04W 12/06
USPC .......................................................... 726/7
See application file for complete search history.

(56) References Cited

U.S. PATENT DOCUMENTS

| | | | |
|---|---|---|---|
| 2010/0225607 A1* | 9/2010 | Kim | G06F 3/042 345/173 |
| 2010/0253788 A1* | 10/2010 | Okano | H04L 63/0492 348/207.1 |
| 2012/0324242 A1* | 12/2012 | Kirsch | G06Q 20/0855 713/189 |
| 2013/0014019 A1* | 1/2013 | Kim | G06F 17/30905 715/738 |
| 2013/0024919 A1 | 1/2013 | Wetter et al. | |
| 2013/0035143 A1* | 2/2013 | Izutsu | G06F 1/1632 455/566 |
| 2013/0132854 A1 | 5/2013 | Raleigh et al. | |
| 2013/0212248 A1 | 8/2013 | Neafsey et al. | |
| 2013/0286889 A1 | 10/2013 | Cherian et al. | |

OTHER PUBLICATIONS

Israel Koren, Fault-Tolerant Systems, Mar. 2007, Morgan Kaufmann Publishers, Full Text.*
Philip Kortum, HCI Beyond the GUI: Design for Haptic, Speech, Olfactory, and Other Nontraditional Interfaces, Apr. 2008, Morgan Kaufmann Publishers, Full Text.*

(Continued)

*Primary Examiner* — Kambiz Zand
*Assistant Examiner* — Stephen Sanders

(57) ABSTRACT

An example touch key system may include a master device, one or more carrier devices and protected devices, and a server. The master device may automatically detect a predefined trigger action. In response, the master device may automatically generate a carrier device credential and a corresponding cloud credential. The master device may then automatically send the cloud credential to the server. The master device may also automatically detect the carrier device in electrical communication with the master device. In response, the master device may automatically determine whether the carrier device credential from the key pair is intended for the carrier device. If so, the master device may automatically transfer the carrier device credential to the carrier device. The carrier device may use the carrier device credential to obtain access to the protected device. Other embodiments are described and claimed.

25 Claims, 9 Drawing Sheets

(56) References Cited

OTHER PUBLICATIONS

Rubens, Paul, "Kiss and Tell", Technology, The Guardian, Mar. 16, 2005, 3 pages. web page available at: http://www.theguardian.com/technology/2005/mar/17/gadgets.onlinesupplement.

Miller, Joe, "Disney develops 'magical' device to make fingertips sing", BBC News, Technology, Sep. 10, 2013, 2 pages. web page available at: http://www.bbc.com/news/technology-24031948.

Hodson, Hal, "Magic microphone lets you whisper with your fingertips", NewScientist, Tech, Sep. 9, 2013, 2 pages. web page available at: http://www.newscientist.com/article/dn24169-magic-microphone-lets-you-whisper-with-your-fingertips.html#.U0cLqlwo5EY.

Porbadnigk et al., "EEG-Based Speech Recognition", Impact of Temporal Effects, 2006, 6 pages. web page available at: http://csl.anthroponnatik.kit.edu/downloads/Biosignals_paper114.pdf.

Porbadnigk et al., "EEG-based Speech Recognition—Impact of Temporal Effects", 2009, 2 pages. web page available at: http://www.bibsonomy.org/bibtex/210c31f2529d22fa0b8eb04a987abb660/dblp.

Pratt, Susan, "Capacitance Sensors for Human Interfaces to Electronic Equipment", Ask The Application Engineer—35, vol. 40, Oct. 2006, 10 pages. web page available at: http://www.analog.com/library/analogdialogue/archives/40-10/cap_sensors.html.

Tatourian, Alan, "Your Future Smart Wristband", Life of Learning, Apr. 3, 2014, 35 pages. web page available at: http://tatourian.com/2014/04/03/your-future-smart-wristband/.

International Search Report and Written Opinion received for PCT Patent Application No. PCT/US2015/029723, mailed on Aug. 6, 2015, 10 pages.

* cited by examiner

US 9,258,304 B2

METHODS AND APPARATUS FOR USING KEYS CONVEYED VIA PHYSICAL CONTACT

TECHNICAL FIELD

Embodiments described herein relate generally to data processing. In particular, embodiments described herein relate to methods and apparatus for conveying digital keys via physical contact and for using such keys to obtain access to or control of physical objects.

BACKGROUND

According to one of the entries at www.merriam-webster.com/dictionary/key, a key is "a usually metal instrument by which the bolt of a lock is turned." For purposes of this disclosure, such keys may be referred to as physical keys.

According to the WIKIPEDIA entry at en.wikipedia.org/wiki/Key (cryptography), in the field of cryptography, a key is "a piece of information (a parameter) that determines the functional output of a cryptographic algorithm or cipher." For purposes of this disclosure, such keys may be referred to as digital keys.

Traditionally, physical keys have been used to control access to valuable, dangerous, or confidential possessions, such as houses, cars, and bank account statements. For instance, if a person wanted to protect sensitive documents from unauthorized viewing, that person could keep those documents in a locked file cabinet. Similarly, if a mother wanted to allow her son to use the mother's car, the mother could give the son a physical key to the car.

The present disclosure describes methods and apparatus for conveying a digital key or related information via physical contact, and for using such information to obtain access to protected resources. Such a system may be referred to as a touch key system.

DESCRIPTION OF EMBODIMENTS

According to the present disclosure, a distributed data processing system may include features for conveying security tokens via physical contact. For purposes of this disclosure, a digital or electronic security token that is conveyed via physical contact may be referred to as a touch key.

According to the present disclosure, the distributed data processing system may also include features for using touch keys to obtain access to, control of, or use of physical objects. For purposes of this disclosure, such a distributed data processing system may be referred to as a touch key system.

Figure 1:
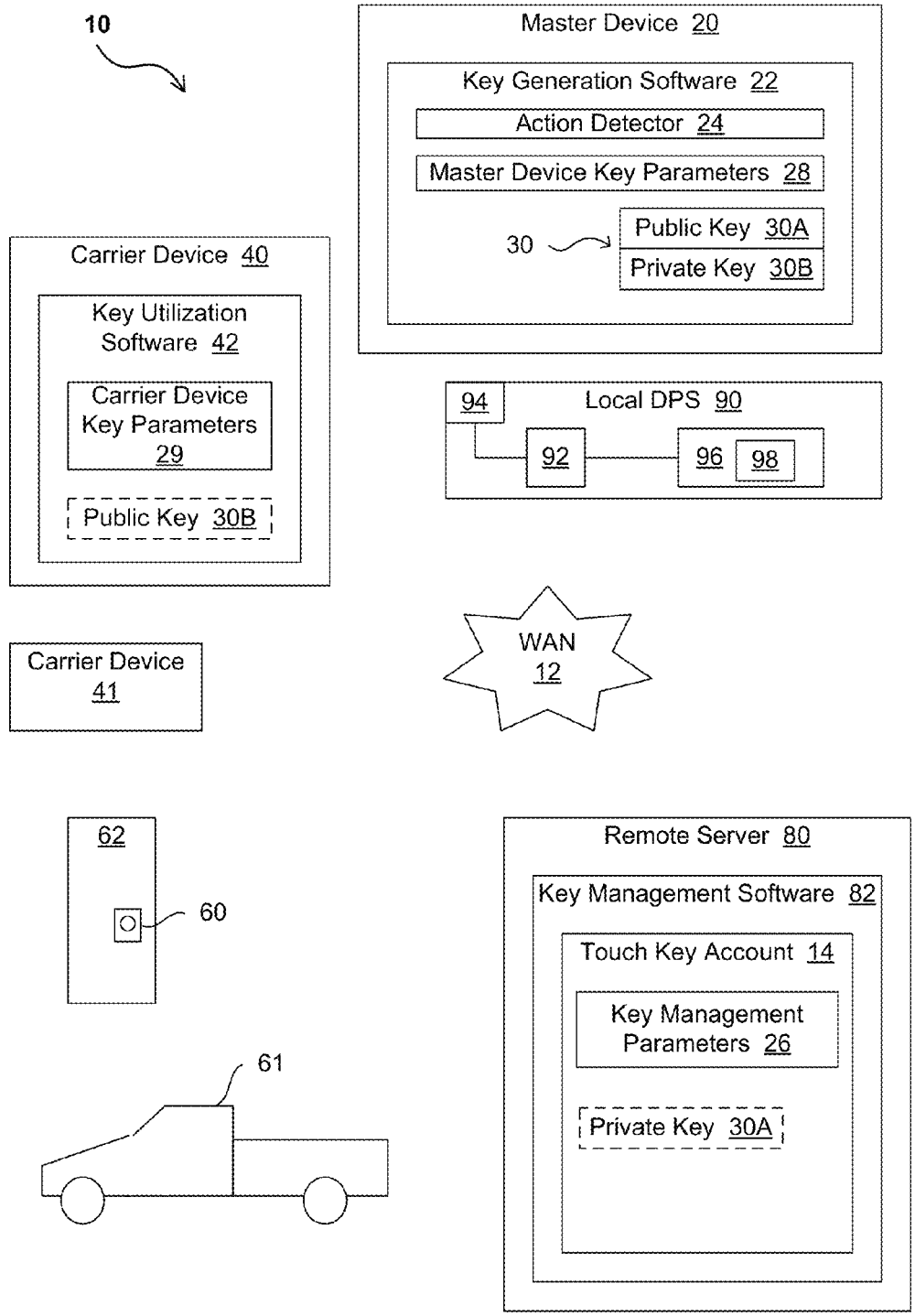
FIG. 1 is a block diagram of an example touch key system.

FIG. 1 is a block diagram of an example touch key system 10. In the embodiment of FIG. 1, touch key system 10 includes a master device 20, carrier devices 40 and 41, protected devices 60 and 61, and at least one remote server 80. Touch key system 10 may also include a local data processing system 90. Some or all of the various devices and processing systems within touch key system 10 may communicate with each other via a wide area network (WAN) 12, such as the Internet, via a local area network (LAN), via a personal area network (PAN), or via any suitable combination of networks.

For purposes of illustration, this disclosure discusses a scenario involving a person named Mary who owns various protected devices, including a vehicle 61 and a house with at least one door 62 with at electronic lock 60. Also, Mary has a son named Del and a daughter named Dakota. Mary uses touch key system 10 to share touch keys with Del and Dakota. Del and Dakota use those touch keys to unlock the door to the house, and possibly to use the vehicle.

In particular, master device 20 may be a very small (e.g., ultramobile) data processing system that is worn by Mary, and carrier devices 40 and 41 may be very small (e.g., ultramobile) data processing systems that are worn by Del and Dakota, respectively. For instance, master device 20 and carrier devices 40 and 41 may be rings to be worn by Mary, Del, and Dakota, respectively. As described in greater detail below, other types of objects may also operate as master devices and carrier devices. The protected devices may be physical objects that are secured against unauthorized access or utilization. In particular, protected device 60 includes control logic which can determine whether or not to allow access, based on a touch key. So does protected device 61.

After configuring touch key system 10 according to her preferences, Mary may use master device 20 to generate the touch keys and share them with Del and Dakota. Del and Dakota may use carrier devices 40 and 41 to receive the touch keys and to share them with protected devices 60 and 61. Protected devices 60 and 61 may then use remote server 80 to determine whether the touch keys are valid. Additional details concerning the operation of touch key system 10 are provided below.

In one embodiment, carrier devices may also be used as master devices, and vice versa. For purposes of this disclosure, the term "touch key device" or "TKD" may be used to refer to (a) a device designed to serve a master device, (b) a device designed to serve a carrier device, or (c) a device designed to be able to serve as a master device and as a carrier device. For instance, Mary, Del, and Dakota may each use the same kind of TKD, with Mary's TKD acting as a master device and Del's and Dakota's TKDs acting as carrier devices. In addition, protected devices may also be referred to as TKDs.

In general, for purposes of this disclosure, a person who controls a master device of a touch key system may be referred to as a master operator or master user. The master operator may also control the configuration of the touch key system. Thus, the master operator may control important aspects of system operation, such as which carrier devices may be used to access or unlock which protected devices. Similarly, a person who is to receive, from the master operator, the ability or authority to access or unlock one or more protected devices may be referred to as a delegate.

Remote server 80 and local data processing system 90 may be implemented with largely conventional computing hardware. For example, local data processing system 90 may be implemented as a desktop personal computer, a laptop or notebook computer, a smartphone, etc. Additional details for remote server 80 are provided below with regard to FIG. 3.

Master device 20 and carrier devices 40 and 41 may be wearable devices, to rest on or be attached to the bodies of their users. For instance, master device 20 and carrier devices 40 and 41 may be implemented (a) as jewelry such bracelets, watches, rings, necklaces, amulets, (b) as part of clothing, or (c) as any other object which includes the necessary processing and communication resources and which can be worn in electrical communication with the user's body. Additional details for master device 20 are provided below with regard to FIG. 4. Additional details for carrier device 40 are provided below with regard to FIG. 5.

In the embodiment of FIG. 1, protected device 60 is an electronic lock on a door 62, and protected device 61 is a vehicle with an electronic security system to prevent unauthorized entry and utilization. As described in greater detail below with regard to FIG. 6, protected device 60 includes processing and communication resources or facilities which enable protected device 60 to receive touch keys from carrier devices and to communicate with remote server 80 to validate those touch keys. Protected device 61 may include the same or similar facilities as protected device 60.

Touch key system 10 may use a cloud computing model. As explained at http://en.wikipedia.org/wiki/Cloud computing, cloud computing "involves distributed computing over a network, where a program or application may run on many connected computers at the same time." In the embodiment of FIG. 1, various different aspects of touch key system 10 may run on the various devices within touch key system 10 at the same time.

Figure 2:
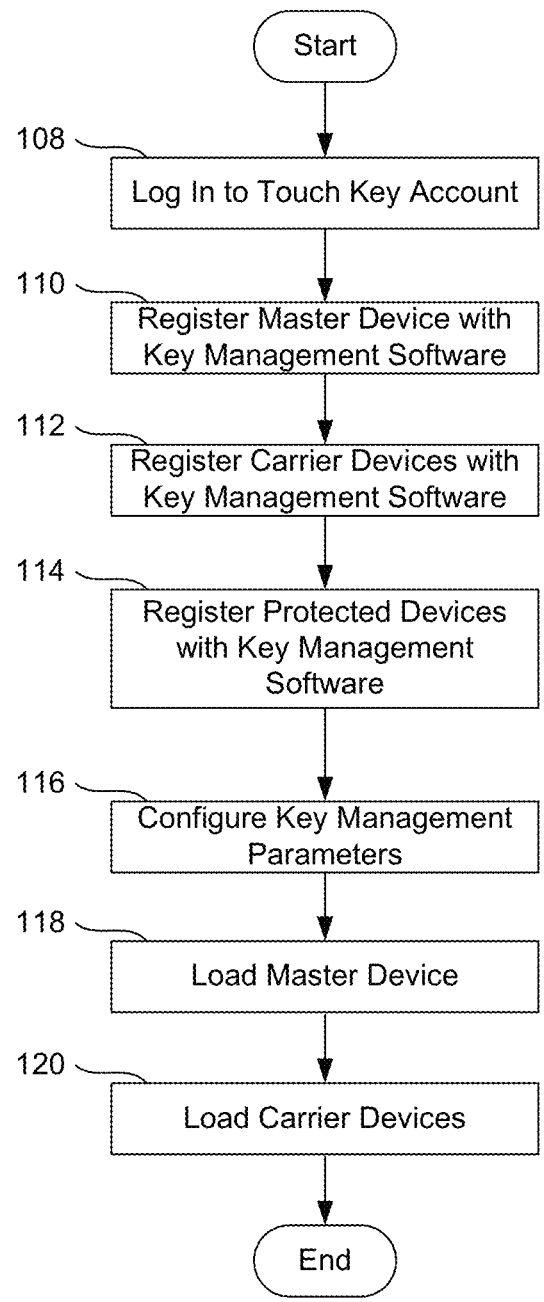
FIG. 2 is a flowchart of an example process for configuring the touch key system of FIG. 1.

FIG. 2 is a flowchart of an example process for configuring touch key system 10. In the illustrated process, Mary uses a client application 98 on local data processing system 90 to interact with key management software 82 on remote server 80. That process may start with Mary logging in to a touch key account 14 maintained for her by key management software 82, as shown at block 108.

As shown in FIG. 1, local data processing system 90 may include a processor 92 in communication with a network port 94 and one or more storage devices 96. For instance, local data processing system 90 may include random access memory (RAM), as well as non-volatile storage, such as a hard disk drive (HDD) and/or flash memory. In addition or alternatively, local data processing system 90 may include multiple processors, other input/output facilities (e.g., a keyboard, a mouse, and a display), and any other suitable facilities or components.

Local data processing system 90 may load client application 98 from the non-volatile storage to the RAM for execution by processor 92. When executed, client application 98 may enable the user to interact with remote server 80, as described in greater detail below.

Figure 3:
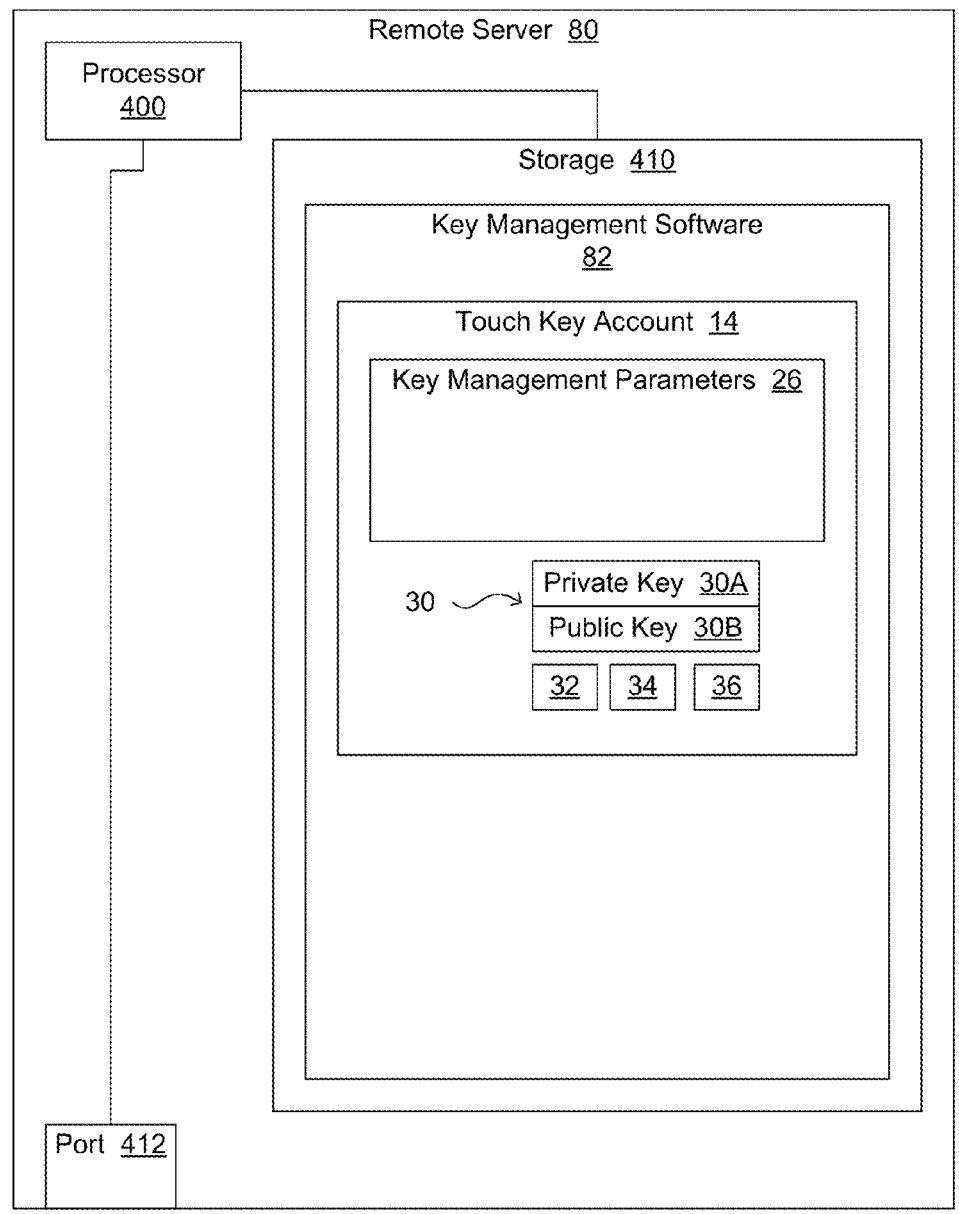
FIG. 3 is a block diagram illustrating the remote server of FIG. 1 in greater detail.

FIG. 3 is a block diagram illustrating remote server 80 in greater detail. In the embodiment of FIG. 3, remote server 80 includes a processor 400 in communication with one or more storage devices 410 and one or more communication ports 412. Port 412 may be a network port, for instance, and remote server 80 may communicate with master device 20, protected devices 60 and 61, and local data processing system 90 via port 412. In another embodiment, remote server 80 may be implemented within a distributed server environment, such as a server farm. In addition or alternatively, remote server 80 may include multiple processors, other input/output facilities (e.g., a keyboard, a mouse, and a display), and any other suitable facilities or components. Communications with remote server 80 may also be considered to be communications with the cloud.

In the embodiment of FIG. 3, key management software 82 resides in storage 410 (which may include volatile storage such as RAM and non-volatile storage such as one or more HDDs, etc.). Remote server 80 may execute key management software 82 on processor 400 to provide the functionality described herein. For instance, key management software 82 may provide the touch key account 14 referenced above. Data processing systems which provide some or all of the functionality provided by remote server 80 (e.g., validation of touch keys) may also be referred to as touch key servers.

As described in greater detail below, once Mary has finished configuring touch key account 14, it may include key management parameters 26. Key management parameters 26 may include parameters to control various aspects of touch key creation (such as defining the conditions which will trigger the creation of touch keys) and parameters to control various aspects of touch key utilization (such as parameters defining the conditions which will trigger key conveyance or sharing, parameters defining key validation rules to be used by remote server 80, etc.).

Also, according to the embodiment of FIG. 3, once Mary has used master device 20 to share touch keys with carrier device 40, touch key account 14 may include one or more public/private key pairs 30, 32, and 34. For instance, key pair 30 may include a private key 30A and a corresponding public key 30B. As described in greater detail below, touch key system 10 may use the public keys and private keys to validate users. However, in alternative embodiments, a touch key system may use digital signatures and/or any other suitable types of digital or electronic security tokens as touch keys or credentials.

In one embodiment, remote server 80 provides some or all of its services as cloud services. Accordingly, key management software 82 may include one or more application program interfaces (APIs) to enable communication with different kinds of devices, such as local data processing system 90, master device 20, and protected devices 60 and 61.

Referring again to FIG. 2, after logging in to her touch key account on remote server 80, Mary may then use any suitable technique to register master device 20 with her touch key account, as shown at block 110. For instance, Mary may use Bluetooth (BT), Bluetooth low energy (BLE), WiFi, or any other suitable protocol to pair master device 20 with another device (e.g., local data processing system 90, a smartphone, etc.) on a trusted network.

Figure 4:
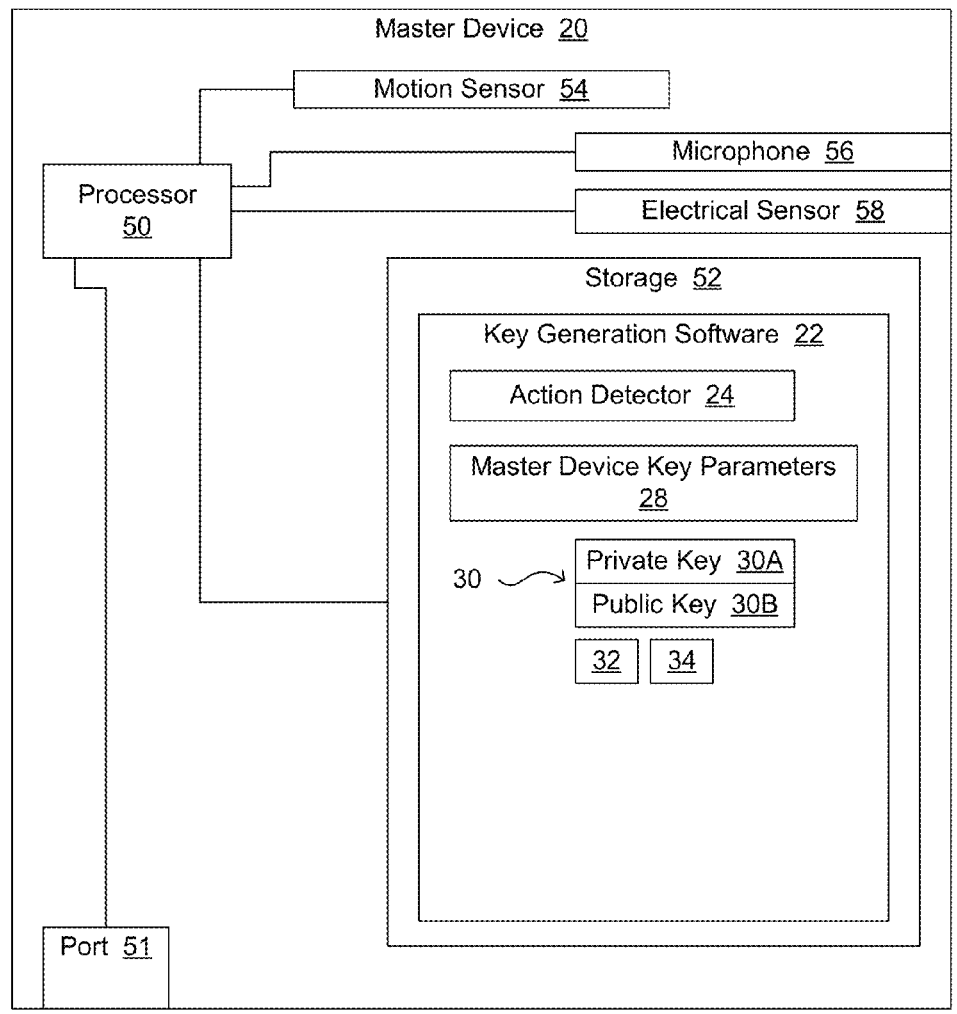
FIG. 4 is a block diagram illustrating the master device of FIG. 1 in greater detail.

FIG. 4 is a block diagram illustrating master device 20 in greater detail. In the embodiment of FIG. 4, master device 20 includes a processor 50 in communication with a communications port 51, a storage device 52, and various input devices, such as a motion sensor 54, a microphone 56, and an electrical sensor 58. Master device 20 may also include other I/O devices, such as buttons, a touch screen, a speaker, etc., in communication with processor 50.

Storage 52 includes key generation software 22 which, when executed by processor 50, creates security tokens, based on least in part on predetermined master device key parameters 28. For instance, key generation software 22 may generate public/private key pairs 30, 32, and 34. Master device key parameters 28 may be a subset of key management parameters 26 from remote server 80. As described in greater detail below, master device key parameters 28 may control various touch key generation and deployment operations to be performed by master device 20. For instance, master device key parameters 28 may identify (a) which carrier devices are to receive which touch keys from master device 20 and (b) which protected devices are to receive touch keys from which carrier devices.

In addition, master device key parameters 28 may identify certain actions as triggers for creating certain kind of touch keys. For example, key generation software 22 may use speech recognition technology to detect that Mary has spoken a code word that has been predefined as a trigger for creating a touch key for a particular carrier device and a particular protected device. In addition or alternatively, key generation software 22 may use motion sensor 54 to detect predefined gestures.

An action detector 24 in key generation software 22 may automatically create security tokens (e.g., key pairs) in response to detecting that Mary has performed the predefined trigger actions with master device 20, as described in greater detail below. Key generation software 22 may also share touch keys (e.g., public keys) with carrier devices (e.g., carrier device 40), as described in greater detail below.

As illustrated at block 112 of FIG. 2, Mary may then use any suitable technique to register carrier devices 40 and 41 with her touch key account. For instance, the same kinds of techniques may be used to register carrier devices and master devices.

Figure 5:
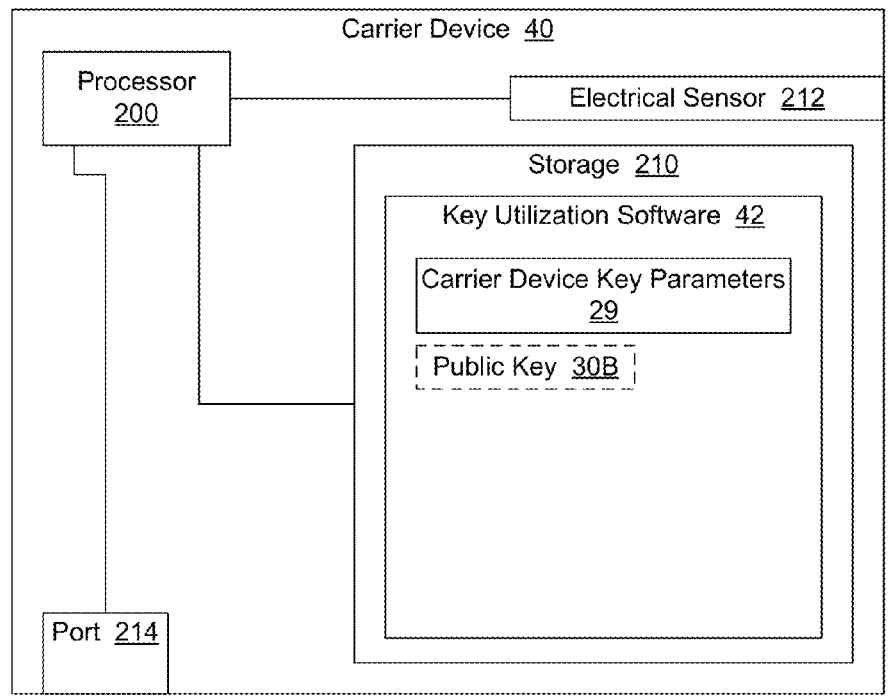
FIG. 5 is a block diagram illustrating a carrier device of FIG. 1 in greater detail.

FIG. 5 is a block diagram illustrating carrier device 40 in greater detail. Carrier device 41 may include the same or similar features. As shown, carrier device 40 may include a processor 200 in communication with a communication port 214, an electrical sensor 212, and storage 210. Furthermore, as indicated above, carrier devices may be implemented as jewelry, clothing, or other wearable objects. A carrier device may use the same or similar hardware as a master device. For instance, as indicated above, in one embodiment, a TKD may be used as a master device or as a carrier device.

In the embodiment of FIG. 5, storage 210 includes key utilization software 42 which, when executed by processor 200, enables carrier device 40 to receive touch keys from master device 20 and to convey touch keys to protected devices 60 and 61, as described in greater detail below. Accordingly, key utilization software 42 may include one or more APIs to enable communication with different kinds of devices, such as master device 20, protected devices 60 and 61, and remote server 80 (e.g., during registration and/or to receive carrier device key parameters).

In the embodiment of FIG. 5, key utilization software 42 includes carrier device key parameters 29. Carrier device key parameters 29 may be a subset of key management parameters 26 from remote server 80. As described in greater detail below, carrier device key parameters 29 may specify how carrier device 40 is to handle touch keys received from master device 20. For instance, carrier device key parameters 29 may control communication of touch keys with protected devices by identifying which protected devices are to receive which touch keys from carrier device 40.

As illustrated at block 114 of FIG. 2, Mary may then use any suitable technique to register protected devices 60 and 61 with key management software 82. For instance, the same kinds of techniques that are used to register carrier devices and/or master devices may be used to register protected devices.

Figure 6:
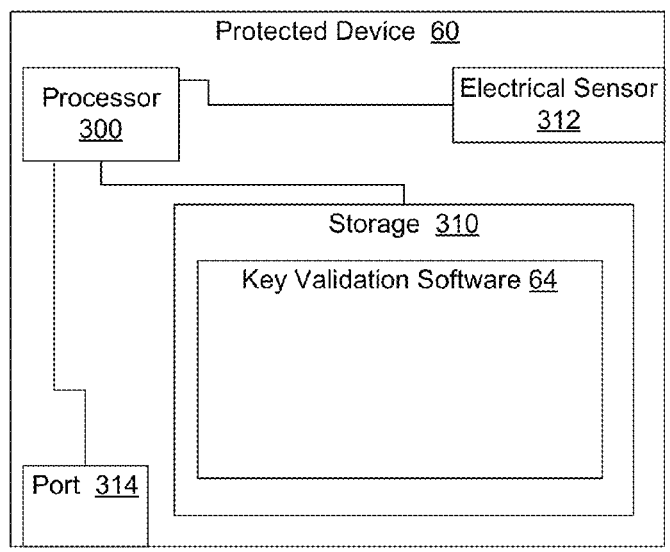
FIG. 6 is a block diagram illustrating a protected device of FIG. 1 in greater detail.

FIG. 6 is a block diagram illustrating protected device 60 in greater detail. As indicated above, protected device 60 includes processing and communication resources or facilities which enable protected device 60 to receive keys from carrier device 40 and to communicate with remote server 80 to validate such keys. In particular, protected device 60 includes a processor 300 in communication with storage 310, an electrical sensor 312, and a port 314. Storage 310 includes key validation software 64 which, when executed by processor 300, enables protected device 60 to receive touch keys from carrier device 40 and to validate such touch keys with remote server 80, as described in greater detail below. Protected device 61 may have the same or similar features as protected device 60.

In one embodiment, protected devices 60 and 61 use their respective communication ports to connect to remote server 80 via a wired or wireless router in the home. In addition or alternatively, protected devices 60 and 61 may use BT, BLE, cellular, or other technologies to communicate with remote server 80. Accordingly, key validation software 64 may include one or more APIs to enable communication with different kinds of devices, such as carrier devices (e.g., to exchange handshakes and receive touch keys) and remote servers (e.g., to validate received touch keys).

As shown at block 116 of FIG. 2, Mary then configures various key management parameters 26 in key management software 82. Key management parameters 26 control many different aspects of touch key generation, touch key sharing or deployment, and touch key validation. Key management software 82 on remote server 90 may provide a configuration interface with various screens containing various user interface (UI) objects for setting key management parameters 26. As indicated above, Mary may use local data processing system 90 to access key management software 82. In one embodiment, the configuration interface provided by key management software 82 is playful and makes the configuration process simple and enjoyable, like a game.

With regard to touch key generation, Mary may define touch key templates for different protected devices, respectively. Those touch key templates may be stored as part of the key management parameters 26, for instance as part of the carrier device key parameters. For example, Mary may define (a) a house touch key template, for creating touch keys to be used with protected device 60 and (b) a vehicle touch key template, for creating touch keys to be used with protected device 61. In addition, Mary may define a trigger action to be included in or linked to each template. When master device 20 subsequently detects such a trigger action, master device 20 may respond by automatically creating a touch key according to the corresponding predefined template.

The templates enable Mary to generate touch keys for particular protected devices and to share those touch keys with particular carrier devices. For example, Mary may define a trigger action that will cause master device 20 to create a touch key for protected device 61 (the vehicle) based an audio input. For example, the trigger action may be configured to create a particular type of touch key (e.g., a touch key for protected device 70) whenever master device 20 hears Mary say a specified word or phrase, such as "abracadabra." Alternatively, the trigger action may be based on a gesture. Such a gesture may be a big hug or any other specified gesture, based on the family and their behavior. For example, Mary may define a trigger action that will cause master device 20 to create a touch key for protected device 60 (the house door) whenever master device 20 detects that Mary has used the big hug gesture. Alternatively, the trigger action may be based on explicit use of a UI (e.g., selection of a selectable button on master device 20 and/or typing of a specified string. In addition or alternatively, trigger actions may be based on any suitable combination of sounds, gestures, and/or UI selections.

In addition, Mary may configure the touch key template to generate a touch key that can be used with any protected device within a set of protected devices. For instance, such a set may include the locks on the front door of the house and on the back door of the house.

With regard to key deployment, a key template may instruct master device 20 that, once a touch key has been generated, it is to be shared with the next carrier device to be recognized by master device 20. Alternatively, Mary may define trigger actions which target touch keys to particular carrier devices, as well as particular protected devices. For example, Mary may define a trigger action for the phrase "X, I love you," where "I love you" indicates that the touch key will be for unlocking protected device 60 (for accessing the house), and where "X" can take the value of "Del" or "Dakota." When master device 20 hears Mary say "Del, I love you," master device 20 may automatically generate a touch key for opening protected device 60, for conveyance to carrier device 40. And when master device 20 hears Mary say "Dakota, I love you," master device 20 may automatically generate a touch key for opening protected device 60, for conveyance to carrier device 41.

Similarly, Mary may define a trigger action for the phrase "drive safely" in combination with a hug of someone wearing a carrier device, where "drive safely" indicates that the touch key will be for unlocking and using protected device 61 (the vehicle), and where master device 20 will automatically target the touch key to the person being hugged, based on detection of that person's carrier device. Consequently, when master device 20 hears Mary say "drive safely" while master device 20 detects that Mary is hugging Del, master device 20 may automatically generate a touch key for opening and using protected device 61, for conveyance to Del's carrier device 40.

Alternatively, Mary may use an input facility such as a button or a touch screen on master device 20 to select a touch key to be transferred and/or an intended recipient. For instance, a touch screen on master device 20 may present a symbol (e.g., an avatar or an icon) for Del and a symbol for Dakota, and Mary may touch the symbol for Del to select Del as the intended recipient of a touch key.

With regard to touch key utilization and validation, Mary may provide settings to control (a) how many times and/or for how long each touch key can be used and (b) when a touch key should be deleted from master device 20, from carrier devices 40 and 41, and/or from remote server 80. For instance, Mary may create key management parameters 26 which allow touch keys for protected device 60 (the door to the house) to be used for one week, and which allow touch keys for protected device 61 (the vehicle) to be used for only twelve hours. Alternatively, Mary may configure a touch key to be usable only a specified number of times (e.g., once). Key management software 82 may also allow Mary to define settings which allow a key to be used X times (or for X period of time), while also causing key management software 82 to notify Mary after the key has been used Y times (or after Y period of times). For instance, Mary may configure touch key system 10 to treat the touch key for protected device 60 as valid for two weeks, but to notify Mary if such a touch key is used for more than one week, to let Mary know that the touch key is outdated and should be changed for tighter security.

As shown at block 118, remote server 80 may then use any suitable technique (e.g., push, pull, WiFi, BT, BLE, etc.) to load master device key parameters 28 into master device 20. As shown at block 120, remote server 80 may also use any suitable technique to load the respective carrier device key parameters into carrier devices 40 and 41.

The configuration process of FIG. 2 may then end.

Figure 7:
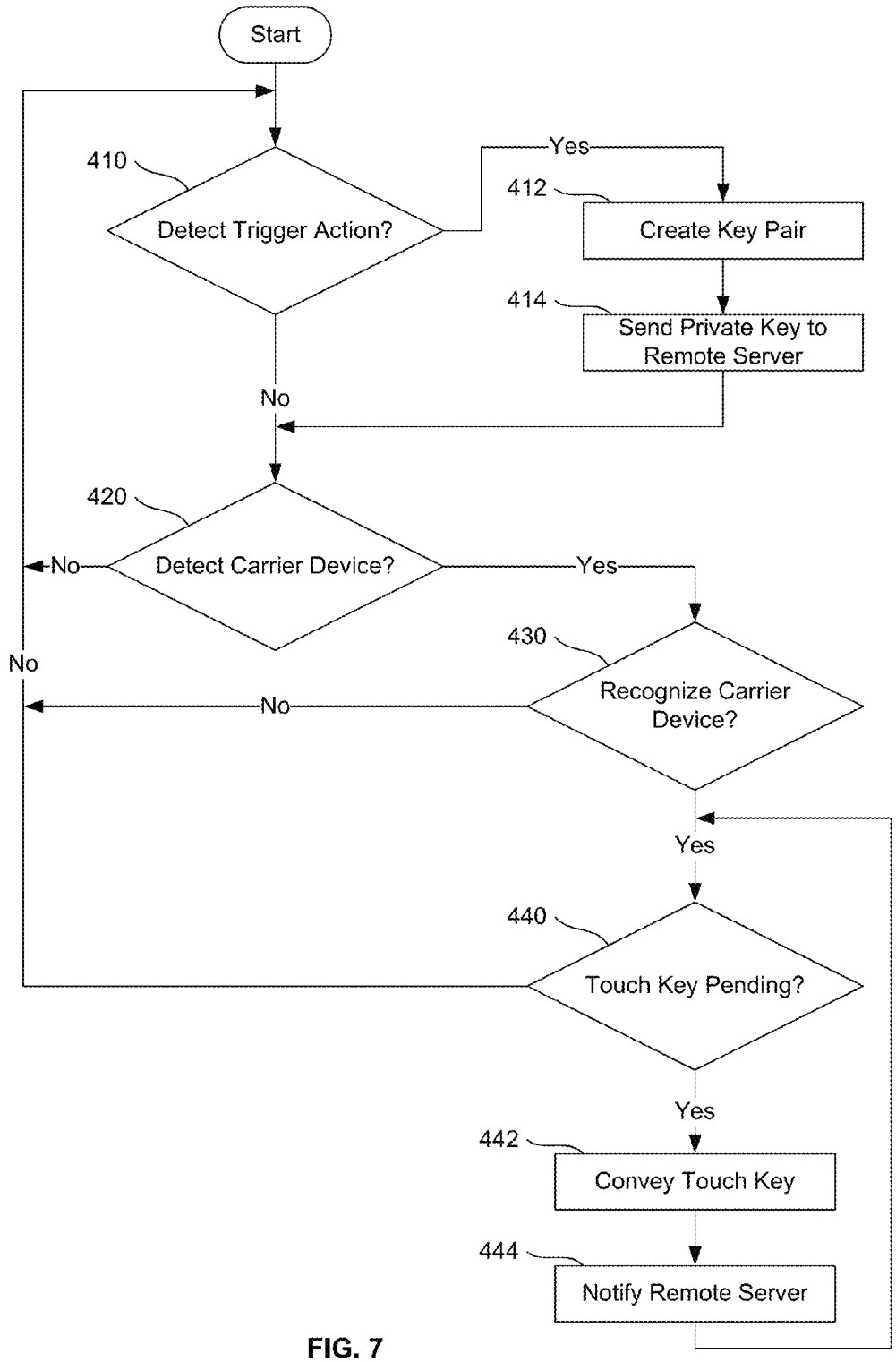
FIG. 7 is a flowchart of an example process for creating and sharing a touch key.

FIG. 7 is a flowchart of an example process for creating and sharing touch keys. Some or all of that process may be performed by key generation software 22 in master device 20. The process starts with key generation software 22 using action detector 24 to determine whether Mary has performed a predetermined trigger action, as shown at block 410. For instance, action detector 24 may use motion sensor 54, microphone 56, and electrical sensor 58 to detect that Mary has said "drive safely" while hugging Del, in accordance with the corresponding trigger action described above. If key generation software 22 has detected a trigger action, key generation software 22 may respond by automatically generating a corresponding set of security tokens, based on a key template associated with the trigger action, as shown at block 412. For instance, key generation software 22 may automatically generate public/private key pair 30, with private key 30A and public key 30B to serve as security tokens.

As shown at block, 414, key generation software 22 may then send one of those security tokens (e.g., private key 30A) to remote server 80. The security token that is sent to remote server 80 may be referred to as a cloud credential or a server credential. As described in greater detail below, remote server 80 may subsequently use the cloud credential to validate a corresponding carrier device credential (e.g., public key 30B), which may be received by remote server 80 from a protected device, after the protected device has received that carrier device credential from a carrier device.

After sending the cloud credential to remote server 80, or if no trigger action was detected, key generation software 22 may determine whether a carrier device has been detected, as shown at block 420. For instance, key generation software 22 may determine that Mary is hugging Del, as indicated above. In particular, key generation software 22 may detect that master device 20 is in electrical communication with carrier device 40 while Mary is hugging Del. Master device 20 and carrier device 40 may use any suitable electronic handshake to detect and recognize each other. Similarly, carrier devices and protected device may use any suitable electronic handshake to detect and recognize each other. Such a handshake may begin when a device detects certain electrical conditions.

Figure 8:
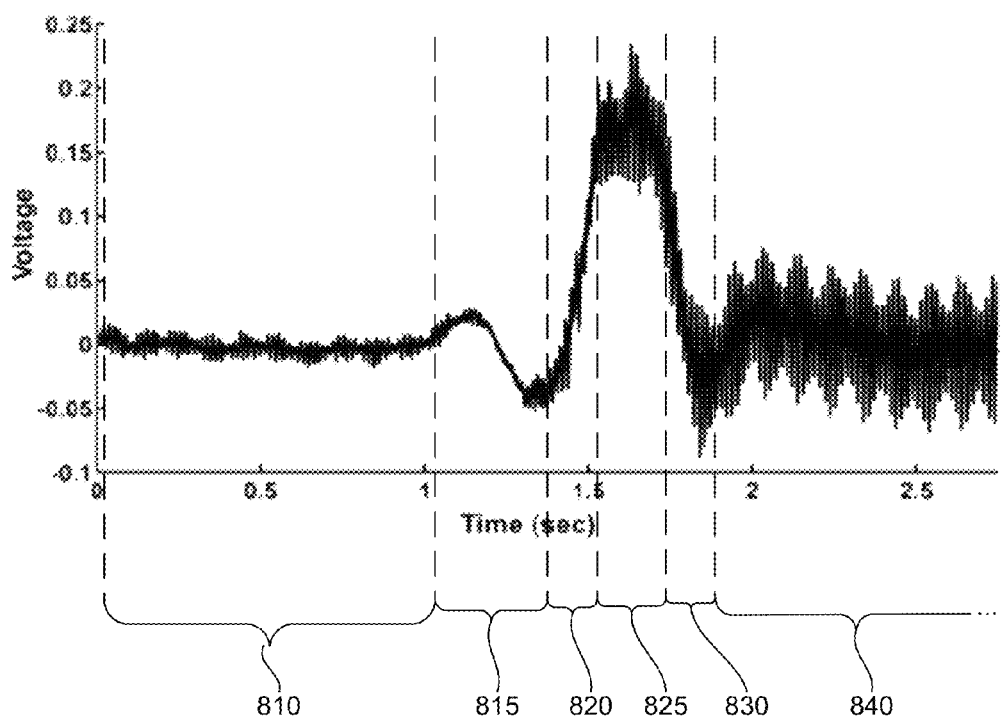
FIG. 8 is a graph of example electrical conditions detected by a master device, a carrier device, or a protected device.

FIG. 8 is a graph of example electrical conditions detected by a master device or a protected device. Such conditions may be detected via electrical sensor 58 of master device 20 or electrical sensor 312 of protected device 60. In one embodiment, the electrical sensor is touching the skin of the person wearing the device. For instance, in an embodiment where master device 20 is implemented as a ring, electrical sensor 58 may be positioned on the inside of the ring where it will always be touching the skin of its user. In the graph of FIG. 8, the changes in voltage are the result of a person who is wearing a master device touching the skin of a person who is wearing a carrier device, or the result of a person who is wearing a carrier device touching a protected device.

The graph shows that, initially, the electrical sensor is picking up a voltage of about zero, as shown at time interval 810. Then, as shown at time interval 815, between the time of 1 and 1.5 seconds, the sensed voltage dips to about −0.05 volts. The voltage then increases rapidly to about 0.2 volts just after the time of 1.5 seconds, as shown at interval 820. The sensed voltage then rapidly jumps and dips between about 0.1 volts and 0.2 volts for a brief period, as shown at interval 825. The sensed voltage then dips to or below −0.05 volts, as shown at interval 830. The sensed voltage then rapidly jumps and dips between about −0.05 volts and 0.05 volts for a relatively extended period of time, as shown at interval 840. Key generation software 22 may monitor the changes in voltage and determine that a carrier device has been detected in response to the sensed electrical conditions matching the pattern illustrated in FIG. 8. For instance, key generation software 22 may determine that a carrier device has been detected in response to the spike at interval 820.

In response to determining that a carrier device has been detected, master device 20 may attempt an electronic handshake with the detected device. One example handshake process may proceed with devices exchanging short messages as follows:

1. Master device 20: I see a change in capacitance. I am Mary's ring, with ID 897432. Who is there?
2. Carrier device 40: I recognize that ID. I am Del's ring, with ID 123456.
3. Master device 20: I know that ID. Here's a touch key you can use: xyzqtr.
4. Carrier device 40: Receipt confirmed.

Steps 1 and 2 may be performed during interval 825 and/or 830. Steps 3 and 4 may be performed during interval 840. Master device 20 may thus detect and communicate with carrier devices 40 and 41. The same or similar detection and handshake techniques may be used (a) by key validation software in protected devices to detect carrier devices, and (b) by key utilization software in carrier devices to detect master devices and protected devices Referring again to FIG. 7, if key generation software 22 detects a carrier device, key generation software 22 may then determine whether the carrier device is recognized as having been registered by Mary as part of touch key system 10, as shown at block 430. If key generation software 22 recognizes the carrier device, key generation software 22 may then determine whether master device 20 has a touch key or carrier device credential pending for that carrier device. For example, at an earlier time, master device 20 may have created a touch key for Del in response to Mary saying "Del, I love you." Master device 20 may then keep that touch key pending until Del's carrier device 40 connects to master device 20. If key generation software 22 determines that a touch key for the recognized carrier device is pending, key generation software 22 may then share that touch key (e.g., public key 30B) with the carrier device, as shown at block 442. Thus, master device 20 uses the electrical conductivity of Mary's and Del's bodies to transmit a touch key to Del. Accordingly, the components which allow master devices and carrier devices to communicate touch keys (e.g., electrical sensors 58 and 212 and the control logic for performing handshakes and sharing information) may be referred to as a touch interface, as may the same or similar components in protected devices. Practically any kind of touch may be sufficient to transfer a touch key, from a simple finger touch to a hug or a kiss.

As soon as the touch key or carrier device credential has been transferred and acknowledged, communication between the devices may stop. FIG. 8 illustrates a process that may take more than one second. But in other embodiments, the entire detection and transmission process may take much less time (e.g., less than a tenth of a second).

Also, in one embodiment, if one device detects and recognizes another, but then transmission of the touch key fails, the devices may then use alternative communications techniques (such as the power-friendly, wireless communications technology known as Bluetooth Smart, or other wireless technologies) to complete transmission of the touch key.

In addition, key generation software 22 may notify key management software 82 in remote server 80 that master device 20 has shared the touch key with the carrier device, as shown at block 444. Key generation software may send such notification as soon as master device 20 comes in contact with a trusted communications conduit, such as a WiFi hotspot, a Bluetooth hotspot, or any other suitable means of communication. Also, transmission of a touch key may be transactional, and the success or failure result may be stored on the devices in order to prevent re-transmissions and to save power. Such success or failure results may also be stored by key management software 82 in remote server 80.

The process may then return to block 440, with master device 20 determining whether any additional touch keys are pending for the detected carrier device. For instance, after Mary has finished a morning routine that causes master device 20 to generate two touch keys for Del and one touch key for Dakota (e.g., to give Del and Dakota access to protected device 60, and to give Del access to protected device 61), master device 20 may include three sets of security tokens 30, 32, and 34. Each set may include a cloud credential (e.g., private key 30A) and a corresponding carrier device credential (e.g., public key 30B). Sets 30 and 32 may be intended to give Del access to protected device 60 and protected device 61, respectively. And set 34 may be intended to give Dakota access to protected device 60. When master device 20 subsequently detects and recognizes Del's carrier device, master device 20 may then convey touch keys 30 and 32 (as carrier device credentials) to Del's carrier device.

After all pending touch keys for the present carrier device have been conveyed, or if no carrier device has been detected or recognized, the process may then return to block 410, with master device 20 continuing to check for trigger actions and carrier devices, as indicated above.

In addition, key utilization software 42 may download touch keys from remote server 80, for instance if carrier device 40 was not online when Mary touched Del after generating a touch key for Del. Consequently, even if carrier device 40 was offline during physical contact, it would still receive the key when turned on and when within presence of a trusted connection.

Figure 9:
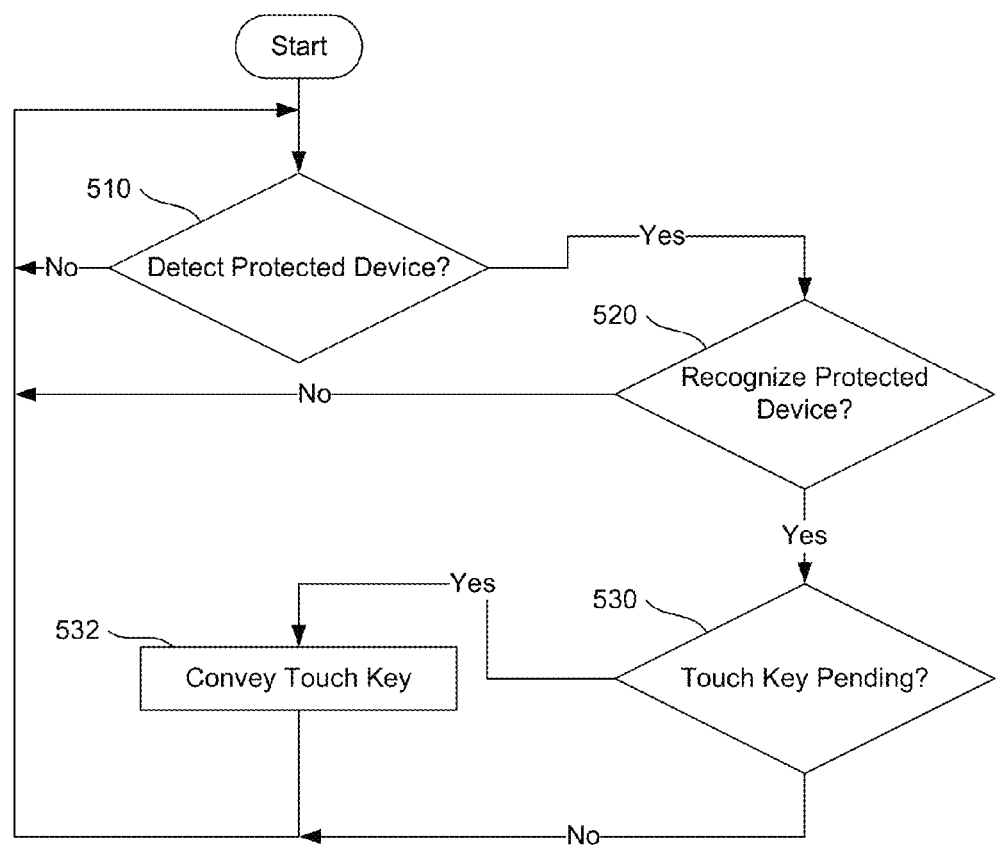
FIG. 9 is a flowchart of an example process for utilizing a touch key to obtain access to or control of a protected device.

FIG. 9 is a flowchart of an example process for utilizing a touch key to obtain access to or control of a protected device. For instance, a touch key may be used to obtain access to operate a protected device. Some or all of the illustrated process may be performed by key utilization software in a carrier device. For purposes of illustration, that process may start after master device 20 has (a) created key pair 30 to provide access to protected device 60, (b) shared private key 30A with remote server 80, and (c) shared public key 30B with carrier device 40. As shown at block 510, key utilization software 42 in carrier device 40 may then determine whether key utilization software 42 has detected a protected device in communication with carrier device 40. For instance, if Del is touching protected device 60, carrier device 40 may detect protected device 60 using techniques like those describe above with regard to FIG. 8. If key utilization software 42 detects a protected device, key utilization software 42 may then determine whether it recognizes the protected device, as shown at block 520. For example, carrier device 40 and protected device 60 may use a handshake process like the one described above.

As shown at block 530, if key utilization software 42 recognized the protected device, key utilization software 42 may then determine whether carrier device 40 has a touch key pending for that protected device, based on carrier device key parameters 29. If carrier device 40 has a touch key pending for the protected device, key utilization software 42 may share the touch key with the protected device, as shown at block 532. For instance, if carrier device 40 detects protected device 60 in the scenario described immediately above, key utilization software 42 may share public key 30B (as a carrier device credential) with protected device 60.

The process may then return to block 510, with carrier device 40 continuing to check for protected devices, as indicated above.

Figure 10:
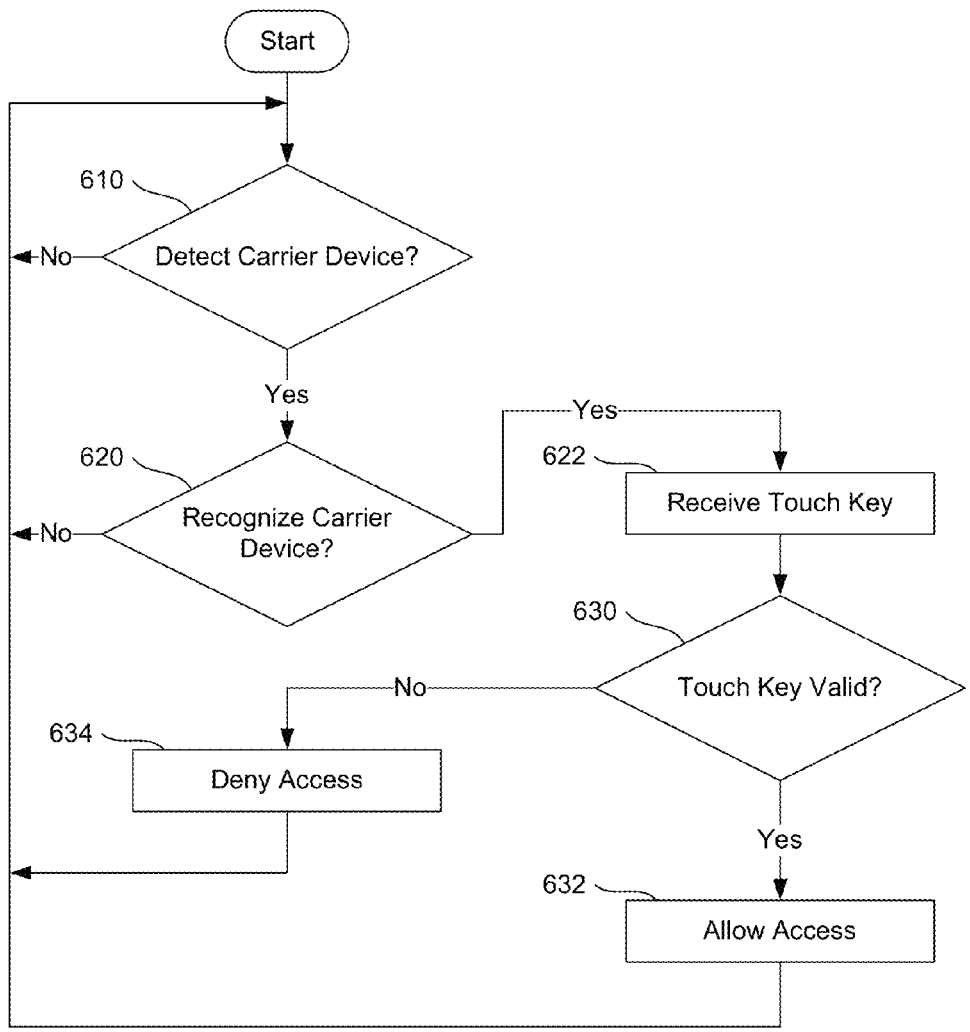
FIG. 10 is a flowchart of an example process for operating a protected device.

FIG. 10 is a flowchart of an example process for operating a protected device. That process is described with regard to a scenario where Mary has already used master device 20 (a) to create key pair 30 to provide access to protected device 60, (b) to share private key 30A with remote server 80, and (c) to share public key 30B with carrier device 40. As shown at block 610, key validation software 64 in protected device 60 may then determine whether key validation software 64 has detected a carrier device in communication with protected device 60. For instance, if Del is touching protected device 60 while wearing carrier device 40, key validation software 64 may detect carrier device 40 using techniques like those describe above with regard to FIG. 8. If key validation software 64 detects a carrier device, key validation software 64 may then determine whether it recognizes the carrier device, as shown at block 620. For example, carrier device 40 and protected device 60 may use a handshake process like the one described above.

If protected device 60 recognizes the carrier device, protected device 60 may then receive a touch key or carrier device credential from the carrier device, as shown at block 622. For instance, carrier device 40 may send public key 30B to protected device 60, based on carrier device key parameters 29 indicating that public key 30B is intended for protected device 60. Protected device 60 may then determine whether the received touch key is valid, as shown at block 630. For instance, protected device 60 may send the touch key to remote server 80, remote server 80 may then use private key 30A to determine whether public key 30B actually originated from master device 20, and remote server 80 may return a result to protected device 60 indicating whether or not public key 30B is valid.

If remote server 80 reports that the carrier device credential is valid, protected device 60 may allow access (e.g., by unlocking door 62), as shown at block 632. On the other hand, if the carrier device credential is not valid, protected device 60 may deny access (e.g., by keeping door 62 locked), as shown at block 634. The process may then return to block 610, with key validation software 64 continuing to check for carrier devices, as indicated above.

Thus, touch keys may be used to obtain access to or control of protected resources. For instance, if Mary has conveyed a touch key for protected device 61 to Del, when Del then touches the handle to the car door, the car, almost by magic, automatically unlocks itself. And when Del touches the start button inside the car, the car starts. This is possible because Mary's master device transmitted a cloud credential to the cloud, to await a request for validation. The car reads the corresponding carrier device credential from Del's carrier device, and the car sends it to the cloud to be validated, based on the cloud credential. If the validation operation succeeds, the device in the car performs the action it is designed to do: the door opens, the car starts, etc.

In addition, key management software 82 in remote server 80 may maintain a log of actions, for audit purposes and to learn the behavior of the users. For instance, key management software 82 may log key validation attempts and results. Key management software 82 may also automatically detect suspicious activity and, in response, automatically revoke touch keys and/or notify the users asking them to take some action.

Furthermore, local data processing system 90 may also operate, at least in part, as a protected device. For instance, Mary may configure resources (e.g., a computer file or a set of computer files) in local data processing system 90 as being protected by touch key system 10. Consequently, to access or use that resource, the user of local data processing system may need to have a carrier device with a touch key with suitable authority.

As has been described, an example touch key system involves small form factor (SFF), wearable, ultramobile computing devices which allow users to automatically generate touch keys and automatically share those keys via touch, based on environmental sensors such as microphones, motion sensors, and electrical sensors.

The touch key system may use body capacitance to act as a network that enables transmission of shared secrets between personal user devices upon contact between two people. A master device may generate touch keys dynamically and seamlessly communicate touch keys to desired carrier devices. The touch key system thus makes security less noticeable than conventional security systems while providing strong and trustworthy security, with UIs that are easy to understand and utilize, thus providing a good user experience (UX).

In one embodiment, a master device generates a touch key based on sounds detected by the master device. For instance, if the trigger action is a "secret" word or phrase, the master device may convert the detected word or phrase into a cryptographic key or key pair.

In one embodiment, public keys are used as the touch keys. In another embodiment, digital signatures are used as the touch keys. As indicated above, such public keys, digital signatures, and similar types of data may be referred to as tokens.

Master devices and carrier devices may remember several touch keys or tokens, and the touch keys could be refreshed, removed, or replaced any time. A master device allows the master operator to select which touch key will be transmitted via touch. The master operator may also turn transmission off when desired, to prevent the inadvertent sharing of touch keys.

The term "Internet of things" or "IoT" refers to a system of devices that allows people to connect with remote objects. The protected devices and other components of the touch key system may be considered part of the IoT.

The present teachings may be used to provide security with great flexibility for a wide variety of contexts. For instance, a touch key system may be configure to control access to computer resources, to televisions, to houses, to vehicles, and to practically any other protected device. For instance, when a family has a television with the features of a protected device illustrated herein, the touch key system can be used to restrict usage of the television for a child to impose limits concerning the days, the times of day, and the total time per day (or week, or other time period) that the child can use the television.

According to the present teachings, a user such as Mary may use a touch key system to share touch keys amongst family and friends. Mary may think of a secret word for the purpose of unlocking shared resources, be they computer resources or physical objects such as doors and cars. The touch key system may convert the secret word into a touch key that will be communicated to another person via a physical body-to-body touch.

For example, Mary may select a secret word or code word which will be used as the seed for a passcode to unlock the house in the afternoon when Del comes back from school. Any suitable sounds may be used as a code word, including without limitation numbers, words, and phrases. Mary's family may then practice the following early morning family activities. The family meets for breakfast. Mary pronounces the predefined code word. A wearable master device attached to Mary's body converts the code word into a public key or digital signature to serve as a touch key. When Mary hugs Del to wish him a good day at school, the master device automatically transfers the touch key to Del via body-to-body touch, and the touch key is automatically stored on Del's carrier device. Later that afternoon, when Del comes home, he just touches the door handle, and the door automatically unlocks.

Similar use cases can be practiced with computer shared devices and resources.

The mode of delivery may be considered secret, since an observer would not see any keys being passed. Accordingly, the touch keys may also be considered to be secrets.

The present disclosure describes methods and apparatus for generating, sharing, and using touch keys. For purposes of illustration, the present disclosure describes one or more example embodiments, but the present teachings are not limited to those particular embodiments. Other configurations are contemplated. In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. As indicated above, the present teachings may be used to advantage in many different kinds of data processing systems. Example data processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, smartphones. handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a mobile device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with support for touch keys. The data processing system comprises a processing element, a machine accessible medium responsive to the processing element, and data in the machine accessible medium. When that data is accessed by the processing element, the data enables the data processing system to serve as a master device that performs operations comprising (a) after the master device, a protected device, and a carrier device have been registered as parts of a touch key system, automatically detecting a predefined trigger action; (b) in response to detecting the predefined trigger action, automatically generating a carrier device credential and a corresponding cloud credential; (c) after automatically generating the cloud credential, automatically sending the cloud credential to a remote server to enable the cloud credential to be used in controlling access to the protected device; (d) after automatically generating the carrier device credential, automatically detecting a device in electrical communication with the master device; (e) in response to automatically detecting the device in electrical communication with the master device, automatically determining whether the device is the carrier device registered with the touch key system; (f) in response to determining that the detected device is the carrier device, automatically determining whether the carrier device credential is intended for the carrier device; and (g) in response to determining that the carrier device credential is intended for the carrier device, automatically transmitting the carrier device credential to the carrier device.

Example A2 includes the features of Example A1, and the data processing system further comprises an electrical sensor responsive to the processing element. Also, the operation of automatically detecting the device in electrical communication with the master device comprises using the electrical sensor to determine whether a user of the master device and a user of the device are touching.

Example A3 includes the features of Example A1, and the operations further comprise receiving, from the remote server, master device key parameters which (a) describe the predefined trigger action and (b) associate the predefined trigger action with the carrier device. Also, the operation of detecting the predefined trigger action is performed after receiving the master device key parameters from the remote server. Example A3 may also include the features of Example A2.

Example A4 includes the features of Example A3, and the master device key parameters define at least one of a gesture and a sound as at least part of the predefined trigger action. Also, the operation of detecting the predefined trigger action comprises automatically determining whether a user of the master device has made at least one of the gesture and the sound. Example A4 may also include the features of Example A2.

Example A5 includes the features of Example A1, as well as the protected device of Example A1 and the carrier device of Example A1. Example A5 may also include the features of any one or more of Examples A2 through A4.

Example A6 includes the features of Example A5, and the cloud credential comprises a private key. Also, the carrier device credential comprises a public key that corresponds to the private key. Also, the carrier device comprises control logic which enables the carrier device to perform operations comprising (a) receiving the public key from the master device, and (b) conveying the public key to the protected device. Example A6 may also include the features of any one or more of Examples A2 through A4.

Example A7 includes the features of Example A5, and the protected device comprises control logic which enables the protected device to perform operations comprising (a) receiving the carrier device credential from the carrier device; (b) in response to receiving the carrier device credential from the carrier device, automatically contacting the touch key server to determine whether the carrier device credential is valid; and (c) in response to determining that the carrier device credential is valid, allowing a user of the carrier device to use the protected device. Example A7 may also include the features of any one or more of Examples A2 through A6.

Example B1 is a method for operating a master device of a touch key system. The method comprises (a) automatically detecting a predefined trigger action at a master device of a touch key system that involves the master device, a carrier device, a touch key server, and a protected device; (b) in response to detecting the predefined trigger action, automatically generating a carrier device credential and a corresponding cloud credential at the master device; (c) after automatically generating the cloud credential, automatically sending the cloud credential from the master device to the touch key server to enable the cloud credential to be used in controlling access to the protected device; (d) after automatically generating the carrier device credential, automatically detecting the carrier device in electrical communication with the master device; (e) in response to automatically detecting the carrier device, automatically determining whether the carrier device credential is intended for the carrier device; and (f) in response to determining that the carrier device credential is intended for the carrier device, automatically transmitting the carrier device credential to the carrier device.

Example B2 includes the features of Example B1, and the operation of automatically detecting the carrier device in electrical communication with the master device comprises using an electrical sensor of the master device to determine whether a user of the master device and a user of the device are touching.

Example B3 includes the features of Example B1, and the method further comprises receiving, from the touch key server, master device key parameters which (a) describe the predefined trigger action and (b) associate the predefined trigger action with the carrier device. Also, the operation of detecting the predefined trigger action is performed after receiving the master device key parameters from the touch key server. Example B3 may also include the features of Example B2.

Example B4 includes the features of Example B3, and the master device key parameters define at least one of a gesture and a sound as at least part of the trigger action. Also, the operation of detecting the predefined trigger action comprises automatically determining whether a user of the master device has made at least one of the gesture and the sound. Example B4 may also include the features of Example B2.

Example C1 is a method for operating a carrier device of a touch key system. The method comprises (a) at a carrier device of a touch key system, receiving a carrier device credential from a master device of the touch key system; (b) after receiving the carrier device credential from the master device, automatically detecting a protected device in electrical communication with the carrier device; (c) in response to automatically detecting the protected device in electrical communication with the master device, automatically determining whether the carrier device credential is intended for the protected device; and (d) in response to determining that the carrier device credential is intended for the protected device, automatically transmitting the carrier device credential to the protected device to prove that a user of the carrier device is authorized to use the protected device.

Example C2 includes the features of Example C1, and the method further comprises, at the carrier device, automatically detecting that the user of the carrier device and a user of the master device are touching. Also, the operation of receiving the carrier device credential from the master device is performed in response to automatically detecting that the user of the carrier device and the user of the master device are touching.

Example C3 includes the features of Example C1, and the operation of automatically detecting the protected device in electrical communication with the carrier device comprises automatically detecting that the user of the carrier device is touching the protected device. Also, the operation of automatically transmitting the carrier device credential to the protected device is performed in response to detecting that the user of the carrier device is touching the protected device. Example C3 may also include the features of Example C2.

Example D1 is a method for operating a protected device of a touch key system. The method comprises (a) at a protected device of a touch key system, automatically detecting a carrier device of the touch key system in electrical communication with the protected device; (b) in response to automatically detecting the carrier device in electrical communication with the protected device, automatically sending an identifier for the protected device to the carrier device; (c) after automatically sending the identifier for the protected device to the carrier device, receiving a carrier device credential from the carrier device; (d) in response to receiving the carrier device credential from the carrier device, automatically sending the carrier device credential to a touch key server, to determine whether a user of the carrier device is authorized to use the protected device; and (e) in response to determining that the user of the carrier device is authorized to use the protected device, allowing the user of the carrier device to use the protected device.

Example D2 includes the features of Example D1, and the operation of automatically detecting the carrier device in electrical communication with the protected device comprises automatically detecting that the user of the carrier device is touching the protected device.

Example D3 includes the features of Example D1, and the operation of automatically sending the identifier for the protected device to the carrier device is performed after the protected device, the carrier device, and a master device have been registered as parts of the touch key system. Example D3 may also include the features of Example D2.

Example D4 includes the features of Example D3, and the carrier device credential comprises part of a public/private key pair that was generated by the master device according to predefined master device key parameters. Those master device key parameters (a) identify a predefined trigger action and (b) associate the predefined trigger action with the protected device. Example D4 may also include the features of Example D2.

Example E is at least one machine accessible medium comprising computer instructions for supporting touch keys. The computer instructions, in response to being executed on a data processing system, enable the data processing system to perform a method according to any one or more of Examples B1 through D4.

Example F is a data processing system with support for touch keys. The data processing system comprises a processing element, at least one machine accessible medium responsive to the processing element, and computer instructions stored at least partially in the at least one machine accessible medium. Also, in response to being executed, the computer instructions enable the data processing system to perform a method according to any one or more of Examples B1 through D4.

Example G is a data processing system with support for touch keys. The data processing system comprises means for performing the method of any one or more of Examples B1 through D4.

Example H1 is an apparatus to support touch keys. The apparatus comprises a non-transitory machine accessible medium and data in the machine accessible medium which, when accessed by a data processing system, enables the data processing system to serve as a master device of a touch key system that involves the master device, a carrier device, a touch key server, and a protected device. In particular, the data enables the master device to perform operations comprising (a) automatically detecting a predefined trigger action at the master device; (b) in response to detecting the predefined trigger action, automatically generating a carrier device credential and a corresponding cloud credential at the master device; (c) after generating the cloud credential, automatically sending the cloud credential from the master device to the touch key server to enable the cloud credential to be used in controlling access to the protected device; (d) after generating the carrier device credential, automatically detecting the carrier device in electrical communication with the master device; (e) in response to detecting the carrier device, automatically determining whether the carrier device credential is intended for the carrier device; and (f) in response to determining that the carrier device credential is intended for the carrier device, automatically transmitting the carrier device credential to the carrier device.

Example H2 includes the features of Example H1, and the operation of automatically detecting the carrier device in electrical communication with the master device comprises using an electrical sensor of the master device to determine whether a user of the master device and a user of the device are touching.

Example H3 includes the features of Example H1, and the operations further comprise receiving, from the touch key server, master device key parameters which (a) describe the predefined trigger action and (b) associate the predefined trigger action with the carrier device. Also, the operation of detecting the predefined trigger action is performed after receiving the master device key parameters from the touch key server. Example H3 may also include the features of Example H2.

Example H4 includes the features of Example H3, and the master device key parameters define at least one of a gesture and a sound as at least part of the trigger action. Also, the operation of detecting the predefined trigger action comprises automatically determining whether a user of the master device has made at least one of the gesture and the sound. Example H4 may also include the features of Example H2.

Example I1 is an apparatus to support touch keys. The apparatus comprises a non-transitory machine accessible medium and data in the machine accessible medium which, when accessed by a data processing system, enables the data processing system to serve as a carrier device of a touch key system that involves a master device, the carrier device, and a protected device. In particular, the data enables the carrier device to perform operations comprising (a) receiving a carrier device credential from the master device of the touch key system; (b) after receiving the carrier device credential from the master device, automatically detecting the protected device in electrical communication with the carrier device; (c) in response to automatically detecting the protected device in electrical communication with the master device, automatically determining whether the carrier device credential is intended for the protected device; and (d) in response to determining that the carrier device credential is intended for the protected device, automatically transmitting the carrier device credential to the protected device to prove that a user of the carrier device is authorized to use the protected device.

Example I2 includes the features of Example I1, and the operations further comprise automatically detecting that the user of the carrier device and a user of the master device are touching. Also, the operation of receiving the carrier device credential from the master device is performed in response to automatically detecting that the user of the carrier device and the user of the master device are touching.

Example I3 includes the features of Example I1, and the operation of automatically detecting the protected device in electrical communication with the carrier device comprises automatically detecting that the user of the carrier device is touching the protected device. Also, the operation of automatically transmitting the carrier device credential to the protected device is performed in response to detecting that the user of the carrier device is touching the protected device. Example I3 may also include the features of Example I2.

Example J1 is an apparatus to support touch keys. The apparatus comprises a non-transitory machine accessible medium and data in the machine accessible medium which, when accessed by a data processing system, enables the data processing system to serve as a protected device of a touch key system that involves a carrier device, the protected device, and a touch key server. In particular, the data enables the protected device to perform operations comprising (a) automatically detecting the carrier device of the touch key system in electrical communication with the protected device; (b) in response to automatically detecting the carrier device in electrical communication with the protected device, automatically sending an identifier for the protected device to the carrier device; (c) after automatically sending the identifier for the protected device to the carrier device, receiving a carrier device credential from the carrier device; (d) in response to receiving the carrier device credential from the carrier device, automatically sending the carrier device credential to the touch key server, to determine whether a user of the carrier device is authorized to use the protected device; and (e) in response to determining that the user of the carrier device is authorized to use the protected device, allowing the user of the carrier device to use the protected device.

Example J2 includes the features of Example J1, and the operation of automatically detecting the carrier device in electrical communication with the protected device comprises automatically detecting that the user of the carrier device is touching the protected device.

Example J3 includes the features of Example J1, and the operation of automatically sending the identifier for the protected device to the carrier device is performed after the protected device, the carrier device, and a master device have been registered as parts of the touch key system. Example J3 may also include the features of Example J2.

Example J4 includes the features of Example J3, and the carrier device credential comprises part of a public/private key pair that was generated by the master device according to predefined master device key parameters. Those master device key parameters (a) identify a predefined trigger action and (b) associate the predefined trigger action with the protected device. Example J4 may also include the features of Example J2.

Example K1 is a data processing system with support for touch keys, the data processing system comprises a processing element, a machine accessible medium responsive to the processing element, and data in the machine accessible medium which, when accessed by the processing element, enables the data processing system to serve as a carrier device. In particular, the data enables the carrier device to perform operations comprising (a) after the carrier device, a master device, and a protected device have been registered as parts of a touch key system, automatically detecting the master device in electrical communication with the carrier device; (b) after automatically detecting the master device in electrical communication with the carrier device, receiving a carrier device credential from the master device; (c) after receiving the carrier device credential from the master device, automatically detecting a protected device in electrical communication with the carrier device; (d) in response to automatically detecting the protected device in electrical communication with the master device, automatically determining whether the carrier device credential is intended for the protected device; and (e) in response to determining that the carrier device credential is intended for the protected device, automatically transmitting the carrier device credential to the protected device to prove that a user of the carrier device is authorized to use the protected device.

Example K2 includes the features of Example K1, and the operation of automatically detecting the master device in electrical communication with the carrier device comprises automatically detecting that the user of the carrier device and a user of the master device are touching.

Example K3 includes the features of Example K1, and the operation of automatically detecting the protected device in electrical communication with the carrier device comprises automatically detecting that the user of the carrier device is touching the protected device. Also, the operation of automatically transmitting the carrier device credential to the protected device is performed in response to detecting that the user of the carrier device is touching the protected device. Example K3 may also include the features of Example K2.

What is claimed is:

1. A data processing system with support for touch keys, the data processing system comprising:
   a processing element;
   a machine accessible medium responsive to the processing element; and
   data in the machine accessible medium which, when accessed by the processing element, enables the data processing system to serve as a master device to perform operations comprising:
      after the master device, a protected device, and a carrier device have been registered as parts of a touch key system, automatically detecting a predefined trigger action;

in response to detecting the predefined trigger action, automatically generating a carrier device credential and a corresponding cloud credential;

after automatically generating the cloud credential, automatically sending the cloud credential to a touch key server to enable the cloud credential to be used in controlling access to the protected device;

after automatically generating the carrier device credential, automatically detecting a device in electrical communication with the master device;

in response to automatically detecting the device in electrical communication with the master device, automatically determining whether the device is the carrier device registered with the touch key system;

in response to determining that the detected device is the carrier device, automatically determining whether the carrier device credential is intended for the carrier device; and in response to determining that the carrier device credential is intended for the carrier device, automatically transmitting the carrier device credential to the carrier device.

2. A data processing system according to claim 1, wherein:

the data processing system further comprises an electrical sensor responsive to the processing element; and the operation of automatically detecting the device in electrical communication with the master device comprises using the electrical sensor to determine whether a user of the master device and a user of the device are touching.

3. A data processing system according to claim 1, wherein the operations further comprise:

receiving, from the touch key server, master device key parameters which (a) describe the predefined trigger action and (b) associate the predefined trigger action with the carrier device; and wherein the operation of detecting the predefined trigger action is performed after receiving the master device key parameters from the touch key server.

4. A data processing system according to claim 3, wherein:

the master device key parameters define at least one of a gesture and a sound as at least part of the predefined trigger action; and the operation of detecting the predefined trigger action comprises automatically determining whether a user of the master device has made at least one of the gesture and the sound.

5. A touch key system comprising:

the master device of claim 1;

the protected device of claim 1; and the carrier device of claim 1.

6. A touch key system according to claim 5, wherein:

the cloud credential comprises a private key;

the carrier device credential comprises a public key that corresponds to the private key; and the carrier device comprises control logic which enables the carrier device to perform operations comprising:

receiving the public key from the master device; and conveying the public key to the protected device.

7. A touch key system according to claim 5, wherein the protected device comprises control logic which enables the protected device to perform operations comprising:

receiving the carrier device credential from the carrier device;

in response to receiving the carrier device credential from the carrier device, automatically contacting the touch key server to determine whether the carrier device credential is valid; and in response to determining that the carrier device credential is valid, allowing a user of the carrier device to use the protected device.

8. A method for operating a master device of a touch key system, the method comprising:

automatically detecting a predefined trigger action at a master device of a touch key system that involves the master device, a carrier device, a touch key server, and a protected device;

in response to detecting the predefined trigger action, automatically generating a carrier device credential and a corresponding cloud credential at the master device;

after automatically generating the cloud credential, automatically sending the cloud credential from the master device to the touch key server to enable the cloud credential to be used in controlling access to the protected device;

after automatically generating the carrier device credential, automatically detecting the carrier device in electrical communication with the master device;

in response to automatically detecting the carrier device, automatically determining whether the carrier device credential is intended for the carrier device; and in response to determining that the carrier device credential is intended for the carrier device, automatically transmitting the carrier device credential to the carrier device.

9. A method according to claim 8, wherein the operation of automatically detecting the carrier device in electrical communication with the master device comprises using an electrical sensor of the master device to determine whether a user of the master device and a user of the device are touching.

10. A method according to claim 8, further comprising:

receiving, from the touch key server, master device key parameters which (a) describe the predefined trigger action and (b) associate the predefined trigger action with the carrier device; and wherein the operation of detecting the predefined trigger action is performed after receiving the master device key parameters from the touch key server.

11. A method according to claim 10, wherein:

the master device key parameters define at least one of a gesture and a sound as at least part of the trigger action; and the operation of detecting the predefined trigger action comprises automatically determining whether a user of the master device has made at least one of the gesture and the sound.

12. An apparatus to support touch keys, the apparatus comprising:

a non-transitory machine accessible medium; and data in the machine accessible medium which, when accessed by a data processing system, enables the data processing system to serve as a master device of a touch key system that involves the master device, a carrier device, a touch key server, and a protected device, wherein the data enables the master device to perform operations comprising:

automatically detecting a predefined trigger action at the master device;

in response to detecting the predefined trigger action, automatically generating a carrier device credential and a corresponding cloud credential at the master device;

after generating the cloud credential, automatically sending the cloud credential from the master device to the touch key server to enable the cloud credential to be used in controlling access to the protected device;

after generating the carrier device credential, automatically detecting the carrier device in electrical communication with the master device;
in response to detecting the carrier device, automatically determining whether the carrier device credential is intended for the carrier device; and
in response to determining that the carrier device credential is intended for the carrier device, automatically transmitting the carrier device credential to the carrier device.

13. An apparatus according to claim 12, wherein the operation of automatically detecting the carrier device in electrical communication with the master device comprises using an electrical sensor of the master device to determine whether a user of the master device and a user of the device are touching.

14. An apparatus according to claim 12, wherein the operations further comprise:
receiving, from the touch key server, master device key parameters which (a) describe the predefined trigger action and (b) associate the predefined trigger action with the carrier device; and
wherein the operation of detecting the predefined trigger action is performed after receiving the master device key parameters from the touch key server.

15. An apparatus according to claim 14, wherein:
the master device key parameters define at least one of a gesture and a sound as at least part of the trigger action; and
the operation of detecting the predefined trigger action comprises automatically determining whether a user of the master device has made at least one of the gesture and the sound.

16. An apparatus to support touch keys, the apparatus comprising:
a non-transitory machine accessible medium; and
data in the machine accessible medium which, when accessed by a data processing system, enables the data processing system to serve as a carrier device of a touch key system that involves a master device, the carrier device, and a protected device, wherein the data enables the carrier device to perform operations comprising:
receiving a carrier device credential from the master device of the touch key system;
after receiving the carrier device credential from the master device, automatically detecting the protected device in electrical communication with the carrier device;
in response to automatically detecting the protected device in electrical communication with the master device, automatically determining whether the carrier device credential is intended for the protected device; and
in response to determining that the carrier device credential is intended for the protected device, automatically transmitting the carrier device credential to the protected device to prove that a user of the carrier device is authorized to use the protected device.

17. An apparatus according to claim 16, wherein the operations further comprise:
automatically detecting that the user of the carrier device and a user of the master device are touching; and
wherein the operation of receiving the carrier device credential from the master device is performed in response to automatically detecting that the user of the carrier device and the user of the master device are touching.

18. An apparatus according to claim 16, wherein:
the operation of automatically detecting the protected device in electrical communication with the carrier device comprises automatically detecting that the user of the carrier device is touching the protected device; and
the operation of automatically transmitting the carrier device credential to the protected device is performed in response to detecting that the user of the carrier device is touching the protected device.

19. An apparatus to support touch keys, the apparatus comprising:
a non-transitory machine accessible medium; and
data in the machine accessible medium which, when accessed by a data processing system, enables the data processing system to serve as a protected device of a touch key system that involves a carrier device, the protected device, and a touch key server, wherein the data enables the protected device to perform operations comprising:
automatically detecting the carrier device of the touch key system in electrical communication with the protected device;
in response to automatically detecting the carrier device in electrical communication with the protected device, automatically sending an identifier for the protected device to the carrier device;
after automatically sending the identifier for the protected device to the carrier device, receiving a carrier device credential from the carrier device;
in response to receiving the carrier device credential from the carrier device, automatically sending the carrier device credential to the touch key server, to determine whether a user of the carrier device is authorized to use the protected device; and
in response to determining that the user of the carrier device is authorized to use the protected device, allowing the user of the carrier device to use the protected device.

20. An apparatus according to claim 19, wherein the operation of automatically detecting the carrier device in electrical communication with the protected device comprises automatically detecting that the user of the carrier device is touching the protected device.

21. An apparatus according to claim 19, wherein the operation of automatically sending the identifier for the protected device to the carrier device is performed after the protected device, the carrier device, and a master device have been registered as parts of the touch key system.

22. An apparatus according to claim 21, wherein the carrier device credential comprises part of a public/private key pair that was generated by the master device according to predefined master device key parameters, wherein the master device key parameters (a) identify a predefined trigger action and (b) associate the predefined trigger action with the protected device.

23. A data processing system with support for touch keys, the data processing system comprising:
a processing element;
a machine accessible medium responsive to the processing element; and
data in the machine accessible medium which, when accessed by the processing element, enables the data processing system to serve as a carrier device to perform operations comprising:
after the carrier device, a master device, and a protected device have been registered as parts of a touch key system, automatically detecting the master device in electrical communication with the carrier device;

after automatically detecting the master device in electrical communication with the carrier device, receiving a carrier device credential from the master device;

after receiving the carrier device credential from the master device, automatically detecting a protected device in electrical communication with the carrier device;

in response to automatically detecting the protected device in electrical communication with the master device, automatically determining whether the carrier device credential is intended for the protected device; and in response to determining that the carrier device credential is intended for the protected device, automatically transmitting the carrier device credential to the protected device to prove that a user of the carrier device is authorized to use the protected device.

24. A data processing system according to claim 23, wherein the operation of automatically detecting the master device in electrical communication with the carrier device comprises automatically detecting that the user of the carrier device and a user of the master device are touching.

25. A data processing system according to claim 23, wherein:

the operation of automatically detecting the protected device in electrical communication with the carrier device comprises automatically detecting that the user of the carrier device is touching the protected device; and the operation of automatically transmitting the carrier device credential to the protected device is performed in response to detecting that the user of the carrier device is touching the protected device.

* * * * *